United States Patent [19]

Sylvester

[11] 4,191,262
[45] Mar. 4, 1980

[54] AGRICULTURE LIGHT TILLAGE IMPLEMENT AND TOOL MOUNTING MECHANISM THEREFOR

[76] Inventor: Merton E. Sylvester, Rte. 3, Sabetha, Kans. 66534

[21] Appl. No.: 938,951

[22] Filed: Sep. 1, 1978

[51] Int. Cl.$^2$ .................. A01B 23/04; A01B 25/00
[52] U.S. Cl. .................. 172/459; 172/484; 172/500
[58] Field of Search .............. 172/310, 459, 460, 464, 172/478, 484, 491, 500, 776, 456

[56] References Cited

U.S. PATENT DOCUMENTS

| | | | |
|---|---|---|---|
| 2,888,891 | 6/1959 | Ackley | 111/80 |
| 2,975,844 | 3/1961 | Oehler | 172/484 |
| 3,003,775 | 10/1961 | Ackley | 280/5 R |
| 3,023,718 | 3/1962 | Sorrensen | 111/85 |
| 3,055,322 | 9/1962 | Oehler | 111/52 |
| 3,080,930 | 3/1963 | Morkoski | 172/307 |
| 3,111,174 | 11/1963 | Fry | 172/464 X |
| 3,327,786 | 6/1967 | Meyer | 172/624 X |
| 3,331,341 | 7/1967 | Hartwig | 111/73 |
| 3,389,754 | 6/1968 | Allison | 172/484 X |
| 3,474,746 | 10/1969 | Hiniker | 111/85 |
| 3,601,202 | 8/1971 | Steffe | 172/484 |
| 3,612,185 | 10/1971 | Grauberger | 172/314 |
| 3,658,361 | 4/1972 | Vanwyk | 172/446 |
| 3,741,137 | 6/1973 | Eisenhardt | 111/6 |
| 3,741,312 | 6/1973 | Hayter | 172/448 |
| 3,874,593 | 4/1975 | Wilt | 111/6 |

Primary Examiner—Richard J. Johnson
Attorney, Agent, or Firm—Fishburn, Gold & Litman

[57] ABSTRACT

A light soil tillage implement is adapted to be drawn by a farm tractor, and is designed to perform a light tillage immediately preceeding fertilizing, planting, and/or other farming operations. The implement comprises a frame having support wheels thereon engaging the ground, one or more tool bars having ground working tools thereon, and a mounting mechanism for each tool bar connecting each tool bar with the frame. Each mounting mechanism comprises a series of linkage elements which resiliently bias the working tools downwardly into the soil when the implement is in a tilling position. The mounting mechanism is adapted to positively lift the tools and tool bars out of engagement with the ground when it is desired to transport the implement, and further individually mounts each tool bar in a manner which allows the same to laterally rotate about a central point thereon in order to follow the contour of the soil independent from the other tool bars. Additional equipment for the farming operations is connected to the tillage implement by a hitching mechanism to allow lateral rotation thereof with respect to the tillage implement, and allow the tillage implement to be used in tandem with trailing farming operations on uneven ground.

10 Claims, 10 Drawing Figures

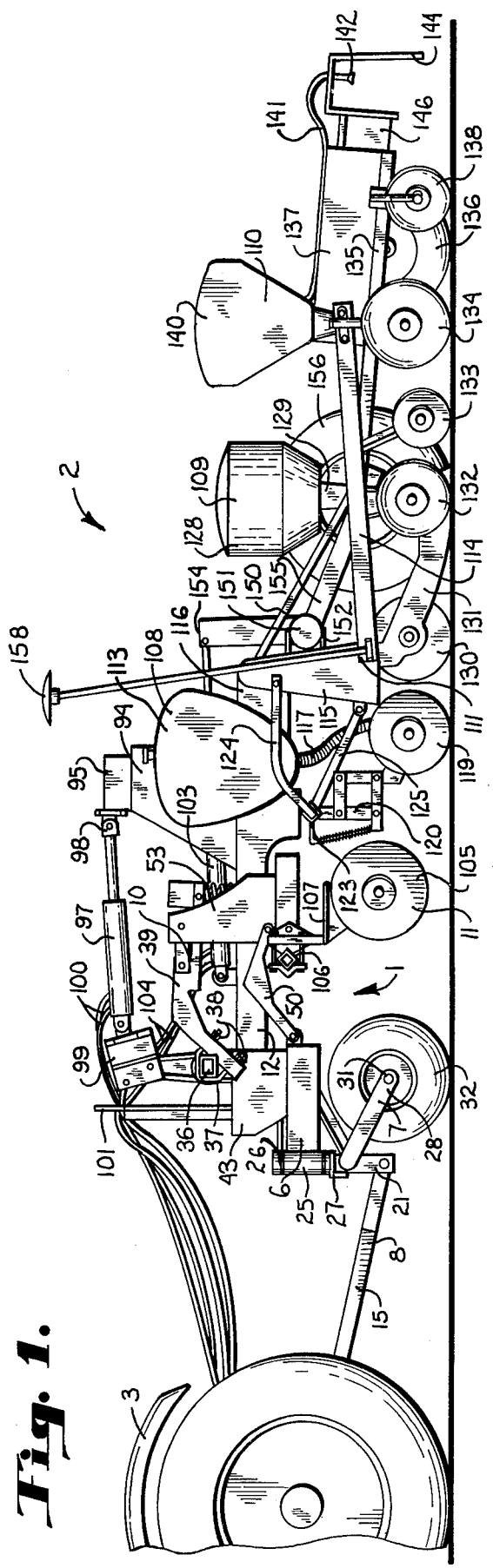

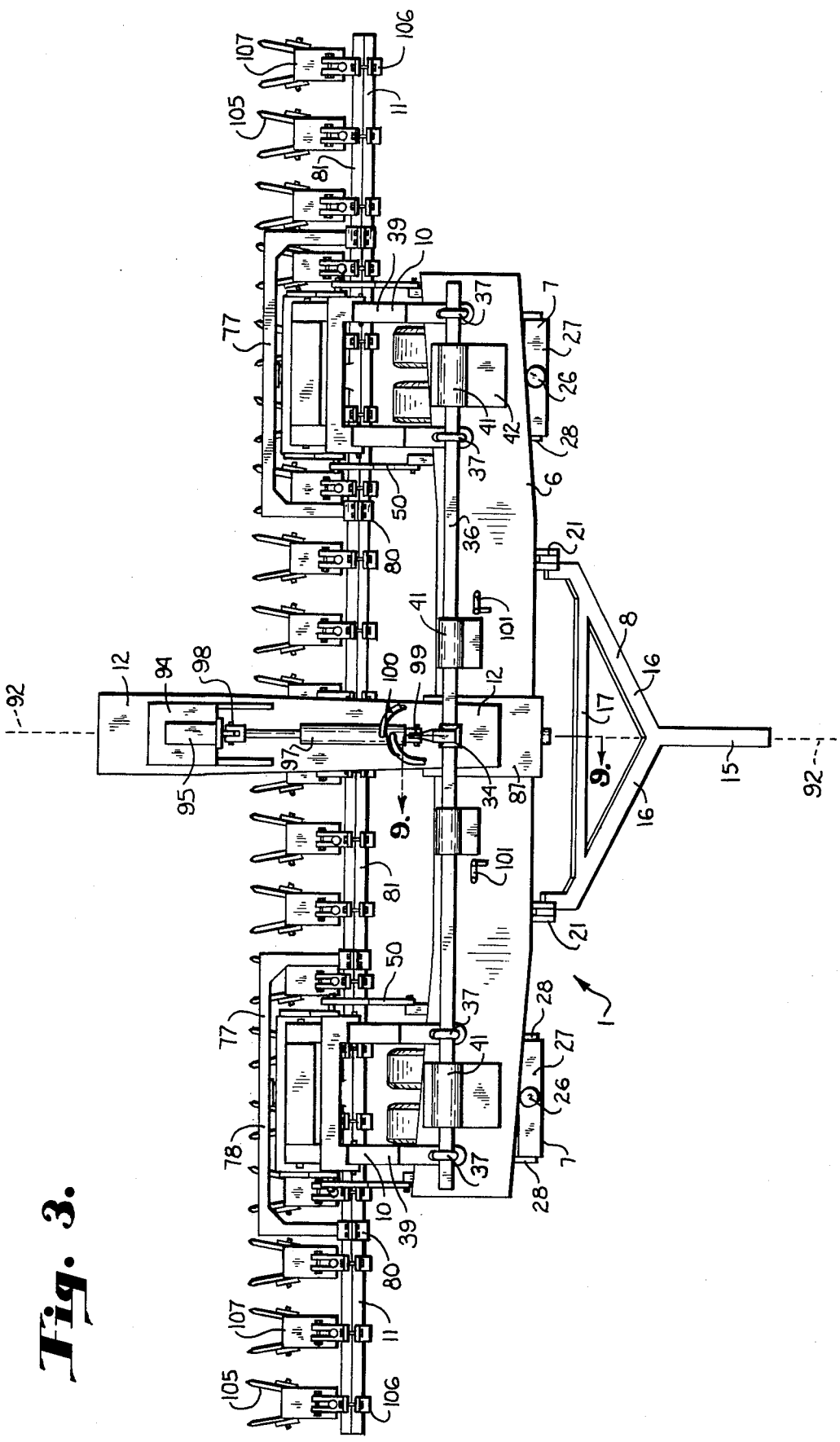

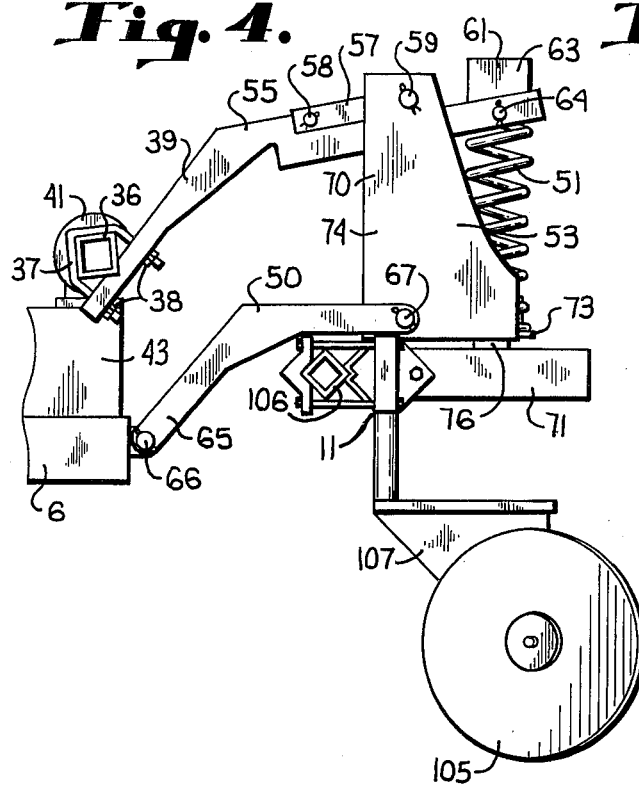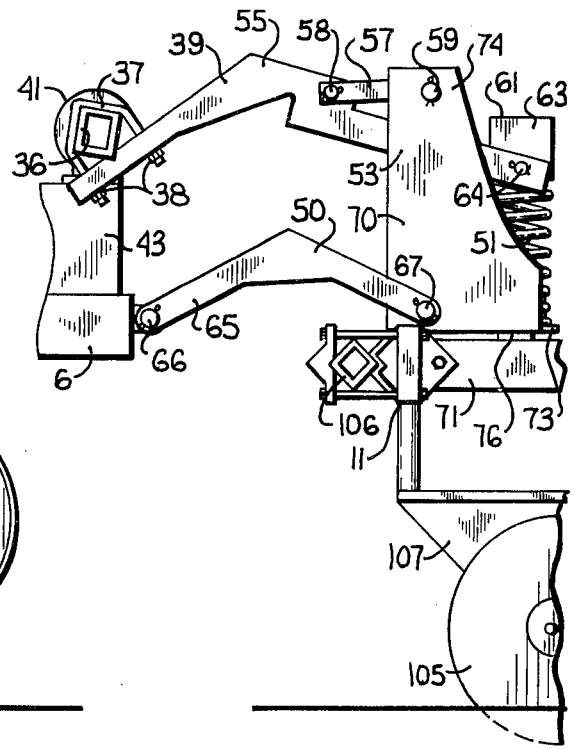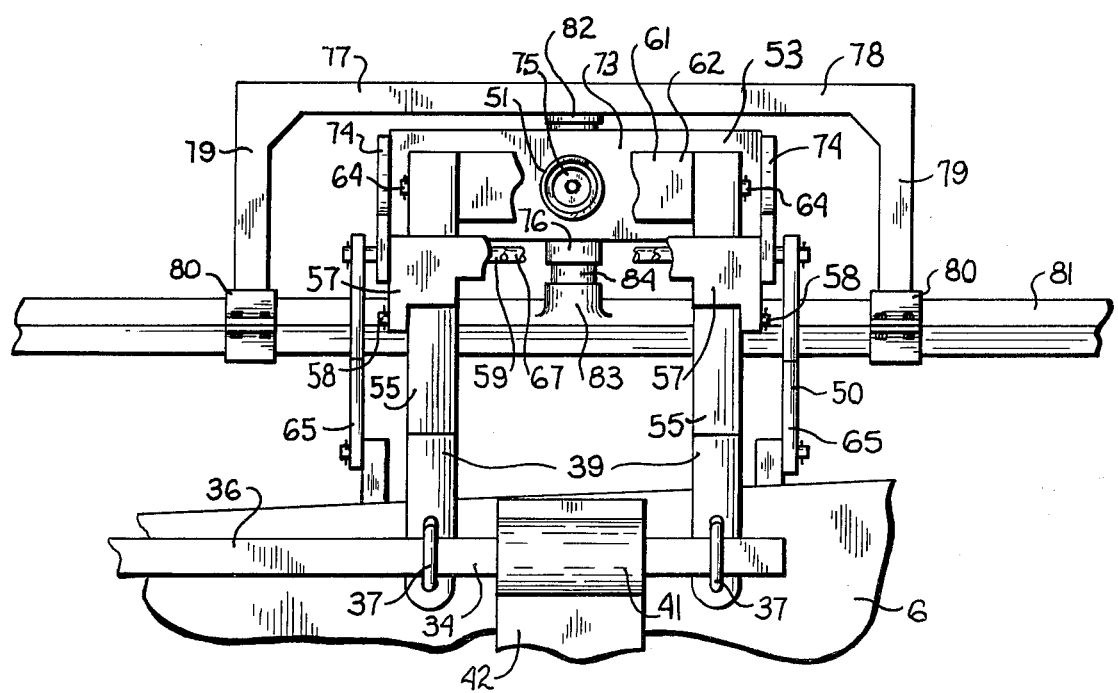

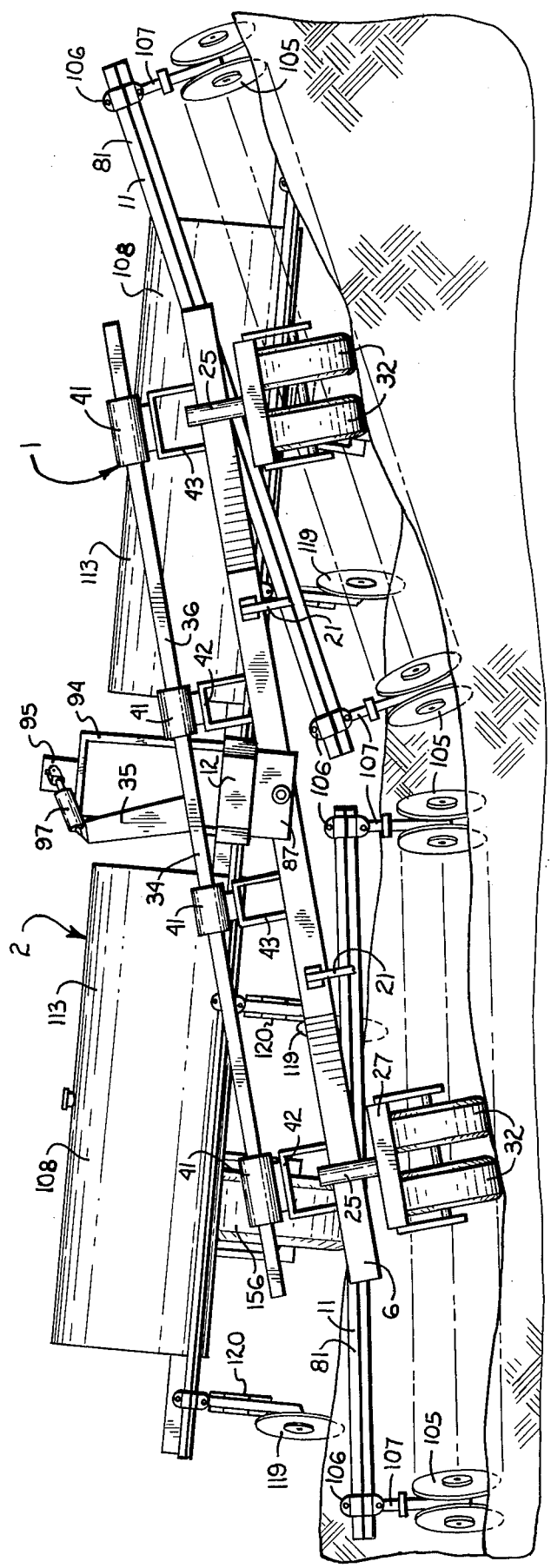

AGRICULTURE LIGHT TILLAGE IMPLEMENT AND TOOL MOUNTING MECHANISM THEREFOR

BACKGROUND OF THE INVENTION

This invention relates to a light tillage implement, and more particularly to such an implement for working uneven ground in combination with other farming equipment.

In the row crop planting process, the field is normally first plowed and cultivated, thereby providing a suitable bed for the crop seeds. However, because the weather is not precisely predictable, rain sometimes occurs after the ground has been plowed and cultivated, but before planting has been accomplished. The rain compacts the soil, and thus, requires some light tillage or reworking thereof, before final planting can occur, thereby requiring the farmer to make an additional tillage pass over his field.

In order to conserve time, the modern farmer often attempts to accomplish several farming operations simultaneously. A problem is created when the above mentioned light tillage step is attempted with other operations such as planting, because the combination of several agricultural devices becomes overly elongate. Thus when traversing rough or uneven ground, especially terraced areas, one of the interconnected devices will raise on one side to follow the contour of the land which will in turn raise the preceeding or trailing device up off the ground since it is positioned over a different contour.

Therefore, a light tillage implement is desired which will independently follow the contour of the land and allow trailing devices to do likewise. It is also desirable to have such an implement which has independent tool bars thereon which can also individually follow the land contour, yet still be selectively biased into the ground to provide an efficient and complete light working thereof. In addition, the light tillage implement should be positively removable from engagement with the ground for purposes of transport to and from the field to be worked.

SUMMARY OF THE INVENTION

Therefore, the principal objectives of the present invention are: to provide a light tillage implement adapted for combination with and immediately preceeding crop planting devices and other agriculture equipment; to provide such an implement which is connected to trailing equipment in such a manner as to independently follow the contour of the ground being traversed thereby; to provide such an implement having a plurality of tool gangs individually mounted thereon which independently follow the contour of the ground in relationship to each other; to provide such an implement having a mounting mechanism for each tool gang which selectively positions each tool gang in ground engagement, and flexibly biases the same downwardly; to provide such an implement wherein each mounting mechanism also positively lifts the respective tool gang from ground engagement for transport between ground areas to be worked; and to provide such an implement which is capable of an extended useful life, and is particularily well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevational view of a light tillage implement emobodying the present invention, in a raised position and shown, in combination with a tractor, a fertilizer spreading device, a planting device, and a herbicide spreading device, all being in a resting position.

FIG. 2 is a front elevational view of the light tillage implement having tool gangs mounted thereon by mounting mechanisms, and wherein the tool gangs are shown in a raised or transport position.

FIG. 3 is a top plan view of the light tillage implement, having the tool gangs mounted thereon by the mounting mechanisms.

FIG. 4 is an enlarged partial side elevational view of the light tillage implement, particularly showing a tool gang in a transport position.

FIG. 5 is an enlarged partial side elevational view of the light tillage implement showing one of the tool gangs in a soil engaging position.

FIG. 6 is an enlarged top plan view of a portion of the light tillage implement detailing one of the mounting mechanisms, having certain parts removed and broken away.

FIG. 10 is a schematic front elevational view of the light tillage implement, the fertilizer spreading device, and the planting device with certain tools and mounting mechanisms removed, shown on uneven ground to illustrate the flexibility between the various parts.

DETAILED DESCRIPTION OF THE PREFERRED EMBODIMENT

Figure 7:
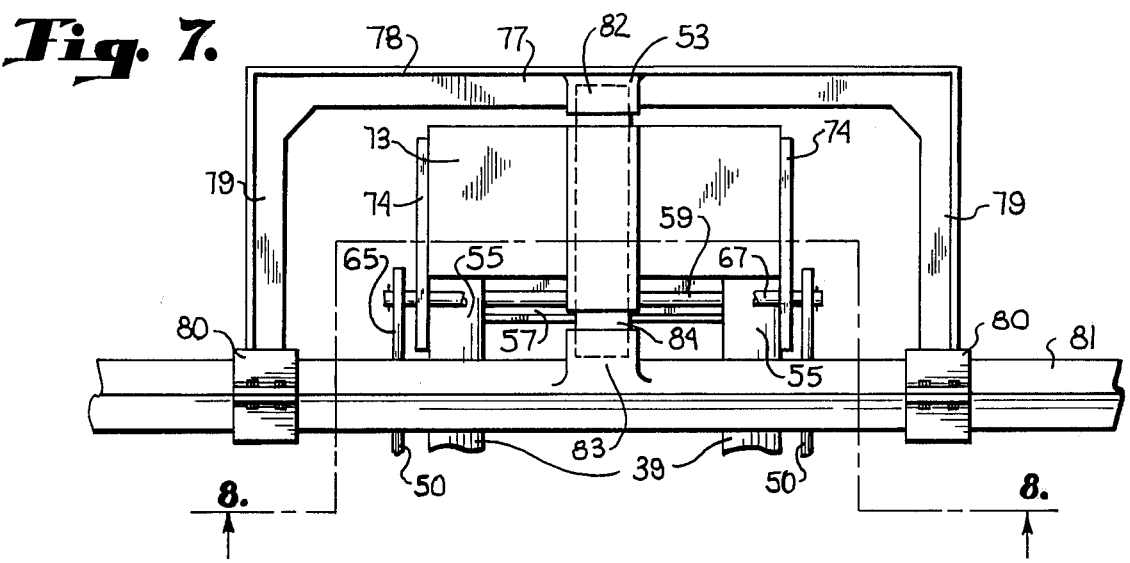
FIG. 7 is an enlarged partial bottom plan view of one mounting mechanisms and the tool gang attached thereto.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

In the illustrated embodiment of the present invention, the reference numeral 1 generally designates an implement for light tillage of soil, and in FIG. 1, is shown in combination with trailing agriculture devices 2 and being drawn by a tractor 3.

For purposes of description herein the terms "front", "frontward", "upper", "lower", "rear" and "rearward" and various derivatives thereof shall relate to the invention as oriented in FIG. 1, however, it is to be understood that the invention may assume various alternative orientations, except where expressly specified to the contrary. In addition, the term "forward motion" refers to movement to the left in FIG. 1.

The light tillage implement 1 comprises a frame member 6 having a plurality of mobile ground engaging supports 7, a tongue 8 for connecting the implement 1 to the tractor 3, a plurality of tool mounting mechanisms 10 each having ground working tool gangs 11 depending therefrom, and a draft bar 12 for connecting the implement 1 to the trailing agriculture devices 2.

The tractor 3 may be any self-propelled mobile vehicle suitable for drawing a load and having horsepower sufficient therefor. The tractor 3, as illustrated, also has a hydraulic oil system (not shown) for operating various components on the implement 1 and trailing agriculture devices 2, as will be discussed in greater detail hereinbelow.

The tongue 8 may be any suitable device for connecting the implement 1 and the tractor 3. The illustrated tongue 8 (FIG. 3) has a trailing arm 15 which connects by a conventional hitch (not shown) to the tractor 3 at one end thereof and to two diverging arms 16 at the opposite end thereof. Between the diverging arms 16 is a cross brace 17. Attached to each of the diverging arms 16 at a rearward end thereof is a journal bearing 18 (FIG. 2). A pair of vertically extending struts 21 (FIG. 3) depend downwardly from and are fixedly attached to the frame member 6. Each strut 21 has a journal 22 (FIG. 2) attached to a lower end thereof which is mounted in one of the bearings 18 respectively, thus allowing radial rotation of the tongue 8 about a horizontal axis passing through the center of the journals 22.

The frame 6 comprises an elongate beam generally extending horizontal to the ground and transverse to the normal forward motion of the implement 1. As illustrated, various members depend from and/or are supported by the frame 6 as will be discussed hereinafter.

The frame 6 is supported by the mobile ground engaging supports or wheel assemblies 7. In the illustrated embodiment, there are two wheel assemblies 7, each having a bearing 25 fixedly attached to the front of the frame 6 and spaced therealong near the outer ends thereof. Each bearing 25 is positioned such that the axis thereof is vertically aligned. A journal or spindle 26 is positioned in each bearing 25 and rotates therein about the vertical axis. Each journal 26 and respective bearing 25 are maintained in a constant relative vertical position relative to one another by caps, pins, or the like at the opposite ends of each journal 26. A crossbar 27 is attached to the lower side of each journal 26 and has an axle strut 28 depending downwardly and rearwardly from each end thereof. A horizontally and transversely extending axle 31 is attached to and connects the lower end of each axle strut 28. A pair of wheels 32 is rotatably positioned on each axle 31. The wheels 32 thereby support the frame 6 and are free to pivot about the axis of the journal 26 in the nature of casters.

Each mounting mechanism 10 is positioned on and extends rearwardly of the frame 6, and connects a tool or tool gang 11 thereto. The number of such mounting mechanisms 10 is variable according to need, however, the illustrated embodiment discloses two such mechanisms 10, each having a respective tool gang 11. Each mounting mechanism is operably connected by a pivot assembly 34 (FIGS. 4, 5 and 6) to the frame 6. Each of the mounting mechanisms 10, as illustrated, has an upper lever or control arm 39. The pivot assembly 34 comprises a rocker bar 36 which is attached to the forward end of each of the control arms 39 by a clamp 37 held in place by fasteners 38. The rocker bar 36 is positioned generally horizontal to the ground and perpendicular to the forward motion of the implement 1. In addition, the rocker bar 36 is mounted to axially rotate in four bearing casings 41. Each bearing casing 41 is mounted on a bracket or shelf 42 attached to the frame 6 by support legs 43. The rocker arm 36 is thus positioned generally parallel to the frame 6 and is rotatable about a horizontal and transverse axis thereof. A lever arm 37 is fixedly mounted perpendicular to the rocker arm 36 and will be discussed later.

Each mounting mechanism 10 basically comprises the control arm 39, a linkage arm 50, a resilient member 51, and a tool support carriage 52. The control arm 39 and linkage arm 50 are both pivotally connected to the frame 6 at a frontward end thereof. The control arm 39 and the linkage arm 50 are generally positioned parallel to each other and are in vertically spaced relation to one another with the control arm 39 being positioned above the linkage arm 50. The support carriage 53 is pivotally attached to the rearward end of the linkage arm 50 at a point spaced apart from the connection of the control arm 39 and the support carriage 52, and has one of the tool gangs 11 connected thereto. The resilient member 51 extends between and is connected to the control arm 39 and the linkage arm 50.

In the illustrated embodiment, the control arm 39 has two parallel somewhat V-shaped segments 55, being horizontally spaced apart. The frontward end of each segment 55 is fixedly secured to the rocker bar 36 by one of the clamps 37, such that each segment 55 extends perpendicularly from the rocker bar 35 and rotates therewith. A control arm 39 having only one or many individual segments 55 is also envisioned under the present invention. It is also foreseen that the control arm 39 could extend forward from the rocker bar 36 rather than rearward to be equivalent. A connecting arm or plate 57 is pivotally connected near a frontward end thereof to a medial point along each control arm 39 by a horizontal pin 58 extending therefrom. The plate 57 extends above and over the control arm 39. It is foreseen that the plate 57 could comprise two separate arms. The plate 57 is also pivotally mounted near a rearward end thereof on a bar 59. The bar 59 is mounted near the top of the support carriage 53. The control arm 39 will raise relative to the linkage arm 50 until the bar 39 acting as a stop is engaged, after the control arm 39 engages the bar 59, the linkage arm 50 moves upwardly with the control arm 39. Maximum extension between the rearward ends of the control arm 39 and linkage arm 50 is thus limited by the bar 59 acting as a stop, the maximum extension being when the control arm 39 is raised against the bar 59 as seen in FIG. 4. The rearward end of each segment 55 is connected by a second plate 61. The plate 61 has a top portion 62 and side portion 63. Each side portion 63 has a pin 64 extending therefrom upon which one of the segments 55 is pivotally mounted respectively.

The linkage arm 50, as illustrated, comprises a pair of horizontally spaced and generally parallel portions 65. The frontward end of each linkage portion 65 is pivotally connected to the frame 6 by a pivot pin 66 and rotates thereabout in a vertical plane. The rearward end of each linkage arm is pivotally mounted on a bar 67 at a point spaced apart from where the connecting plate 57 is attached to the bar 59 and connected to the support carriage 53. The bar 67 is mounted in and extends through a lower portion of the support carriage 53. Again, it is envisioned that the linkage arm 50 could have just one element or a multiple of elements within the scope of the present invention.

The resilient member 51 may be any suitable device which biases apart the rearward ends of the control arm 39 and the linkage arm 50, thus tending to bias the support carriage 53 downwardly when the end of the control arm 39 is moved downwardly. The resilient member 51, as illustrated, is a helically wound compression spring 51. The spring 51 is positioned such that the axis thereof is generally vertical. The top of the spring 51 seats under and thrusts against the plate top 62 and is held in position by a protrusion 69 (FIG. 2) extending downwardly from the plate top 62. The bottom of the spring 51 thrusts against the support carriage 53.

Figure 8:
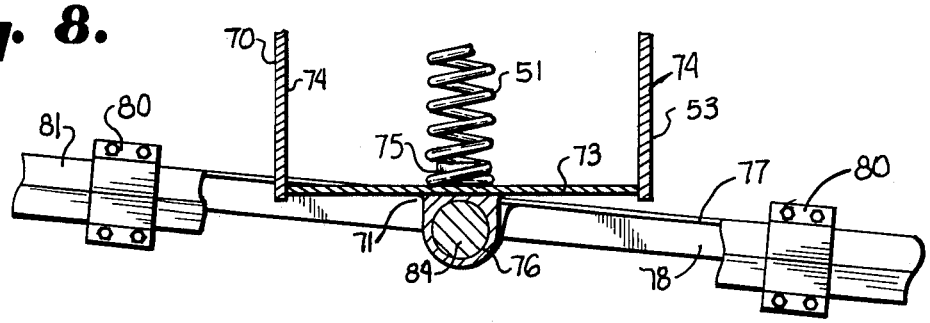
FIG. 8 is a cross-sectional view of the mounting mechanism, taken along line 8—8 of FIG. 7.

The support carriage 53, as illustrated, comprises a main portion 50 and a lower pivot portion 71. The main portion 70 has a base plate 73 and two substantially parallel side plates or stanchions 74 positioned on opposite sides of the base plate 73, and upwardly extending therefrom. The spring 51 is seated on the top of the base plate 73 and held thereon by a core plug 75. A bearing 76 is mounted on and extends below the base plate 73. Horizontal bars 67 and 59 penetrate the side plates at vertically spaced apart points as discussed above. The support carriage lower portion 71 comprises a rectangular frame 77 having a rear member 78 and side members 79. The front end of each side member 79 is attached by a clamp 80 to a tool bar 81. It is envisioned that a different shaped frame 77, such as triangular, would also be functional according to this invention. A journal bearing element 82 is attached to the frame rear member 78 and a second journal bearing element 83 is attached to the tool bar 81. The bearings 82 and 83 are aligned to hold a journal axle 84 therebetween in a generally horizontal position and parallel to the forward motion of the implement 1. The bearings 82 and 83 are positioned in a horizontally spaced apart relation on opposite sides of the frame 77, thereby providing a stable base for journal axle 84. The journal axle 84 is also mounted in the journal bearing 76 such that the support carriage lower portion 70 and the tool bar 81 are free to rotate laterally about the journal axle 84 in a plane perpendicular to the forward motion of the implement 1, as is shown in FIG. 8, but will not substantially rotate in a horizontal plane about the journal axle 84.

Figure 9:
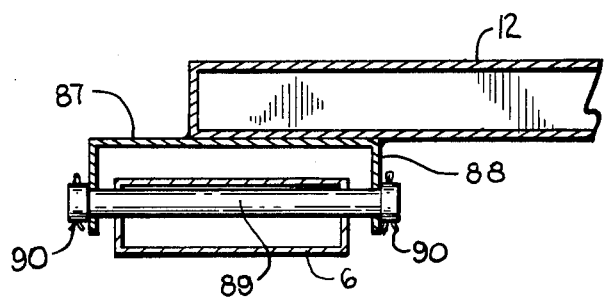
FIG. 9 is a cross-sectional view of a hitching mechanism connecting the light tillage implement to trailing equipment, taken along line 9—9 of FIG. 3, and with background parts removed to simplify the figure.

The draft bar 12 connects the light tillage implement 1 to the trailing agriculture devices 2. In the illustrated embodiment, the draft bar 12 is an elongate beam having a slightly trapezoidal shape when viewed from above and having a downwardly extending rear portion 86. A hitch 87, as best seen in FIG. 9, connects the draft bar 12 to the frame 6. The hitch 87 comprises a C-shaped member 88 fixedly mounted in a downwardly opening position to the front and bottom of the draft bar 12. The C-shaped member 88 somewhat overlaps the frame 6 and is secured thereto by a pivot bar 89 extending through both the frame 6 and C-shaped member 88 and held in place by pins 90. The pivot bar 89 is essentially parallel to a central axis 92 of the draft bar 12 and subsequent trailing devices 2. The C-shaped member 88 is positioned somewhat above the frame 6 so that the frame 6 is allowed to laterally rotate about the axis 92 with respect to the draft bar 12 and trailing devices 2, however, the draft bar 12 remains generally perpendicular to the frame 6 so that the tool gangs 11 remain aligned with the trailing devices 2. A support frame 93 extends downwardly from the draft bar 12 and has a second smaller frame 94 mounted thereon. A hydraulic cylinder 97 is attached to the smaller frame 95 by one hinge 98 and to the lever arm 35 by a second hinge 99, so that the cylinder 97 may flexibly operate therebetween but positively rotates the lever arm 35 in either direction, according to the selection of the operator. Hydraulic oil lines 100 supply and return hydraulic oil from the hydraulic system of the tractor 3 to the cylinder 97. A pair of stanchions 101 extend upwardly from and are fixedly mounted on the frame 6 to support the hydraulic lines 100. A second hydraulic cylinder 103 for controlling the height of the trailing device 2 is pivotally mounted on top of the draft bar 12 and extends rearwardly generally parallel thereto.

The tool gangs 11, as illustrated, comprise the tool bar 81 having ten pairs of ground working disks 105 mounted thereon, each pair of disks 105 being attached to the tool bar 81 by a clamp 106 and a support mounting 107.

The trailing devices 2 may comprise any agriculture equipment before which light tillage is required and as illustrated in FIG. 1 comprise a fertilizer spreader 108, a planter 109, and a herbicide and/or insecticide spreader 110, on an interconnecting frame 111.

The interconnecting frame 111 has a generally horizontal section 114 and an upright section 115, fixedly attached to each other. The upright section 115 is connected to the rearward end of the draft bar 12 by an extension 116.

The fertilizer spreader 108 comprises one or more fertilizer holding tanks 113 fixedly mounted on the frame extension 116. A plurality of tubes 117 funnel the fertilizer from each tank 113 to a selected position relative to the planter 109. Normally there is one tube 117 for each row of crop being planted. A pair of soil working disks 119 work the soil just prior to deposition of fertilizer therein by each tube 117. The disks 119 are downwardly biased by a spring type extension mechanism 120 which comprises a pivotal parallelogram and is connected at an upper end thereof to a bar 123 extending across the width of the trailing device 2. Opposite ends of the bar 123 are fixedly attached to two rearwardly extending arms 124 and 125. The arms 124 and 125 are connected to the frame upright section 115 near an upper and lower end thereof respectively.

Preferably, there is a planter 109 for each row of crop to be planted in each pass across a field. The total number of planters 109 on the frame 111 is also dependent on crop spacing between rows and total width of the frame 111. Each planter 109 comprises a seed containing chamber 128 having a conventional seed drill or seed distributing mechanism (not shown) and a funnel 129 directing seeds to a desired location on the ground. A coulter 130 proceeds a seed furrow opener 131 depending from the frame 111 and having associated distributor disks 132 on each side thereof. A pair of closing disks 133 depend from the frame 111 and trail each furrow opener 131. Another pair of disks 134 depend from the frame 111 and trail the furrow opener 131 with one of each pair being positioned on each side of the furrow respectively. The discs 134 provide light tillage and tend to move stubble from the furrow to the ridge thereof. A cradle frame 135 is attached to and extends rearwardly from each planter 109. A press wheel 136 is pivotally attached to the frame 135 but does not substantially carry any of the load on the frame 111. The tread of the press wheel 136 is raised on the outer edge thereof and the wheel 136 follows the path of the furrow in which the seed is planted thereby packing the ground on each side of the seed because of the raised outer edge. A housing 137 extends over the top half of each press wheel 136. An additional pair of light tillage disks 138 is mounted on the frame 135. Each of the disks 138 is positioned on opposite sides of the furrow and also tend to move field stubble from the furrow to the ridge thereof.

The herbicide and/or insecticide spreader 110 comprises one or more holding tanks 140 mounted on the frame 111. Each tank 140 may contain herbicide, insecticide or mixtures thereof, or each tank 140 may be divided to contain both individually. In the illustrated embodiment, a liquid herbicide is sprayed through a hose 141 and out a plurality of nozzles 142 pressurized therethrough by an air system (not shown). The nozzles 142 open into a spray directing boot 144 which is attached to the cradle frame 135 by connectors 146.

The frame 111 may comprise any suitable bed to support the various agriculture as above described. As illustrated, a crossbrace 150 extends diagonally between the upright section 115 and the horizontal section 114. The horizontal section 114 comprises a plurality of elongate beams arranged in a rectangular pattern which allows free movement of various equipment mounted therethrough. Located medially on the rearward side of the upright section 115 is a horizontally extending journal bar 151 pivotally held in position relative to the frame 111 by a plurality of journal support blocks 152. Extending generally upward from the journal bar 151 is a lever arm 154 which is pivotally attached near an upper end thereof to the rear end of the hydraulic cylinder 103. A plurality of lever arms 155 also extend in a generally rearward and downward direction from the journal bar 151. The rear end of each of the lever arms 155 is pivotally attached to a main support wheel 156. Each wheel 156 is positioned between adjacent planters 109, so that the planters 109 do not interfere with the rotational movement of the wheels 156. A conventional row marker 158 is pivotally attached to the frame 111 and is selectively raised and lowered by a mechanism (not shown).

In use, the tractor 3, light tillage implement 1 and trailing agriculture devices 2 are combined, as is illustrated in the embodiment shown in FIG. 1. For transport to the field, the hydraulic cylinder 97 is activated, so as to lengthen, thereby rotating the lever arm 35 counterclockwise about the rocker bar 36 and the hydraulic cylinder 103 is activated to rotate the lever arm 154 clockwise about the bar 151, as seen in FIG. 1. As lever arm 35 is rotated counterclockwise, the control arm 39 is also rotated counterclockwise until the stop bar is eventually engaged thereby, at this time further counterclockwise rotation of the control arm 39 will positively raise the tool carriage 53 and consequently each tool gang 11. The tool gangs 11 are raised to such a position as to be out of ground engagement and thereby able to be transported over roads, etc. FIG. 1 shows the light tillage implement 1 in the raised position. As the lever arm 154 is rotated clockwise, the lever arms 155 are rotated likewise and the wheels 156 are biased downwardly in relation to the frame 111. This has the net effect of raising the frame 111 and the attendant tools thereon out of ground engagement. As shown in FIG. 1, the tools on the frame 111 are in a resting position and will require additonal raising before transport is possible.

Upon arrival at a field, the opposite procedure is practiced, that is, the hydraulic cylinders 97 and 103 are activated in reverse to that described above, so as to be shortened. Thus, to prepare for agriculture operations the control arms 39 are rotated clockwise as seen in FIGS. 4 and 5 by the shortening of the hydraulic cylinder 97. Each control arm 39 remains in engagement with the stop bar 59 until the discs 105 engage the ground, at which point the ground tends to resist the discs 105. Further, clockwise rotation of each lever arm 39 compresses the associated spring 51, and thus biases the tool support carriage 53 and tool gang 11 with the discs 105 thereon downwardly into the ground. The discs 105 in this manner engage the ground resiliently so that when an unyielding object, such as a rock or the like, is struck by the discs 105, they may raise thereover by further compressing the spring 51. The depth of the discs 105 under normal operation is selectively determined by the extent of clockwise rotation of the control arms 39. Likewise, counterclockwise rotation of the lever arm 154 raises the wheels 156 in relation to the frame 111, this in turn lowers and engages the various discs 119, 132, 133, 134 and 138, the furrow openers 131 and coulters 130 with the ground for normal fertilizing, planting and spraying operations.

When traversing uneven fields each of the tool bars 81 are able to rotate laterally about the respective journal axle 84, but do not rotate in a horizontal plane with respect to the frame 6, as the rectangular geometric shape of the mounting mechanism 10 and the specific positioning of the journal 84 restrict such rotation. Thus each tool gang 11 is free to follow the soil contour engaged by the discs 105 thereon, as shown in FIG. 10. In addition, the light tillage implement is able to laterally rotate about the axis 92 thereof on the hitch 87 relative to the trailing agriculture devices 2, also as shown in FIG. 10. In this manner the implement 1 and trailing agriculture devices 2 can follow different contour over uneven land, so that both continuously remain in a ground engaging position.

It is to be understood that while I have illustrated and described certain forms of my invention, it is not to be limited to the specific forms or arrangement of parts herein described and shown.

What is claimed and desired to secure by Letters Patent is:

1. An agriculture implement for light soil tillage immediately preceeding a trailing, agriculture earth working device, said implement comprising:
   (a) a frame shaped for connection to a forward side of the earth working device, and including mobile ground engaging support means for translating said implement over the ground;
   (b) a control arm having one end thereof pivotally connected with said frame;
   (c) a motor connected with and selectively rotating said control arm with respect to said frame;
   (d) a tool support carriage suspended from and operably connected with the other end of said control arm and adapted for mounting a plurality of earth working tools thereto;
   (e) a linkage arm having first and second ends thereof pivotally connected with said frame and said tool support carriage respectively; said linkage arm second end being spaced apart from said control arm other end to securely retain tool orientation when said implement is in a tilling position;

(f) a longitudinally resilient member having first and second ends thereof respectively connected with said tool support carriage and said control arm other end, whereby rotation of said control arm in a normally downwardly direction resiliently urges said tools into the ground when said implement is in the tilling position;

(g) stop means limiting maximum separation between said tool support carriage and said control arm, and positively interconnecting the same when said implement is in a transport position, whereby rotation of the control arm in a normally upwardly direction lifts said tools out of engagement with the ground for transport;

(h) an elongate tool bar adapted for having said earth working tools mounted therealong, and being pivotally connected with and supported by said tool support carriage, whereby said tool bar laterally pivots with respect to said tool support carriage thereby conforming said earth working tools with the contour of the ground during the tilling position;

(i) a frame attached to a medial portion of said tool bar and extending horizontally therefrom; said frame having a support section horizontally spaced apart from said tool bar; and (j) an axle extending between said tool bar medial portion and said support section; said axle being thereby positioned generally perpendicular to the forward motion of said implement and horizontal; said tool support carriage being pivotally mounted on said axle; whereby said tool bar will rotate laterally about said axle but will not rotate in a horizontal plane in relation to said axle.

2. An agriculture implement for light soil tillage immediately preceeding a trailing, agriculture earth working device, said implement comprising:

(a) a frame shaped for connection to a forward side of the earth working device, and including mobile ground engaging support means for translating said implement over the ground;

(b) a control arm having one end thereof pivotally connected with said frame;

(c) a motor connected with and selectively rotating said control arm with respect to said frame;

(d) a tool support carriage suspended from and operably connected with the other end of said control arm and adapted for mounting a plurality of earth working tools thereto;

(e) a linkage arm having first and second ends thereof pivotally connected with said frame and said tool support carriage respectively; said linkage arm second end being spaced apart from said control arm other end to securely retain tool orientation when said implement is in a tilling position;

(f) a longitudinally resilient member having first and second ends thereof respectively connected with said tool support carriage and said control arm other end, whereby rotation of said control arm in a normally downwardly direction resiliently urges said tools into the ground when said implement is in the tilling position;

(g) stop means limiting maximum separation between said tool support carriage and said control arm, and positively interconnecting the same when said implement is in a transport position, whereby rotation of the control arm in a normally upwardly direction lifts said tools out of engagement with the ground for transport;

(h) an elongate tool bar adapted for having said earth working tools mounted therealong, and being pivotally connected with and supported by said tool support carriage, whereby said tool bar laterally pivots with respect to said tool support carriage thereby conforming said earth working tools with the contour of the ground during the tilling position; and (i) a connector arm pivotally connecting said tool support carriage to said control arm, said connector arm having one end thereof pivotally connected to said control arm at a point spaced inwardly of said control arm other end, an opposite end thereof pivotally connected to said tool support carriage, whereby movement of said tool support carriage relative to said control arm in a horizontal direction is substantially limited, and said tool support carriage may be urged to move in a vertical direction relative to said control arm but is biased to a specific relative position therefrom by said relient member.

3. An implement according to claim 2 including:

(a) a journal-bearing mechanism having a first element and a second element; said first element being fixedly attached to said tool bar and said second element being fixedly attached to said tool support carriage at a spaced apart position from said first element whereby said tool is freely pivotal in said tool support carriage in a plane perpendicular to the line connecting said first and second elements.

4. An implement according to claim 2 wherein:

(a) said control arm comprises first and second segments substantially parallel to and horizontally spaced from each other;

(b) said linkage arm comprises first and second members substantially parallel to and horizontally spaced from each other;

(c) said connector arm comprises first and second portions substantially parallel to each other;

(d) said tool support carriage comprises a first and a second stanchion positioned substantially parallel to each other and interconnected at a lower end thereof by a base section; said connector arm first and second portions being attached to said first and second stanchions respectively; said first and second control arm segments, linkage arm members, connector arm portions and stanchions all being coextensively positioned with respect to one another and forming a generally rectangular volume therebetween; whereby substantial geometric strength is imparted to said implement.

5. An implement according to claim 4 wherein:

(a) said tool support carriage extends above said control arm and has a stop member projecting therefrom; said stop member extends over said control arm and restricts maximum upward movement of said control arm with respect to said tool support carriage, whereby said control arm will raise with respect to said tool support carriage until said stop member is engaged, and thereafter, continued raising of said control arm positively lifts said tool support carriage.

6. An implement according to claim 5 wherein:

(a) said resilient member comprises a compression spring having said first end connected with said tool support carriage and said second end connected with said control arm; said compression spring being preloaded, wherein the same is slightly compressed during the implement transport position, for tool bar stability.

7. An agricultural earth working mechanism, comprising in combination:
  (a) a tractor means;
  (b) a light tillage implement for working soil connected to said tractor means; said implement comprising a mobile frame structure having a plurality of tool bars operably depending therefrom; each of said tool bars being adapted for mounting tools thereon to work soil when in a soil engaged position; each of said tool bars including means to engage and be simultaneously biased toward said soil, and allowing the same to independently follow the contour of said soil;
  (c) a plurality of trailing agriculture devices, each said device performing an agriculture operation; said devices being arranged in a tandem unit behind said light tillage implement; said tandem unit being independently connected with said tillage implement to follow the contour of soil, whereby said soil is lightly tilled, in a single swath across said soil in combination with said agriculture operations, and said tillage implement is free to independently follow the soil contour apart from said tandem unit, thereby permitting multiple farming operations in unison on uneven ground;
  (d) said tillage implement has a hitch receiver mounted thereon; and
  (e) said tandem unit has a hitch mechanism thereon having an engaged position with said hitch receiver; said hitch mechanism including means for permitting free, independent lateral rotational movement of said tandem unit about a longitudinal axis thereof with respect to said tillage implement, and restricting rotational movement of said tandem unit in a horizontal plane with respect to said tillage implement, whereby said implement and said unit maintain a proper alignment and are free to individually follow the soil contour.

8. A mechanism according to claim 7 wherein each of said tool bars is mounted on said frame structure by an apparatus comprising:
  (a) a first and a second control arm being parallel and elongate; each control arm being pivotally connected at one end thereof to said frame structure;
  (b) a first and a second linkage arm being parallel and elongate, each linkage arm being pivotally connected at one end thereof to said frame structure and being positioned below and generally parallel to said control arms;
  (c) a tool support carriage including a base with first and second upright stanchions connected therewith and positioned between said first and second control and linkage arms; said tool support carriage being pivotally connected near a lower end thereof to a second end of each of said linkage arms;
  (d) a first and a second parallel connector arm, each being pivotally connected to an upper end of one of said stanchions and to an associated one of said control arms respectively, whereby said first and second control arms, linkage arms, connector arms and stanchions are substantially coextensively arranged and form a cradle having a generally rectangular volume therebetween; said cradle being substantially stable against rotation in a horizontal plane;
  (e) a cross member connecting second ends of said first and second control arms;
  (f) a compression spring mounted on said tool support carriage base and thrusting against both said cross member and said base, whereby said cross member and said base are flexibly biased apart;
  (g) a stop member connecting said first and second stanchion upper ends; said stop member being positioned above and over said first and second control arms, whereby said control arms may be raised relative to said tool carriage until said stop member is engaged, and thereafter additional raising of said connecting arms also raises said tool carriage; and said control arms may be lowered relative to said tool frame thereby biasing said tool frame downwardly;
  (h) a horizontal rocker axle perpendicularly attached to said tool bar and positioned generally parallel to the forward motion of said implement; and
  (i) a rocker bearing pivotally mounted on said rocker axle and attached to and projecting below said tool support carriage base, whereby said tool bars are substantially free to rotate laterally about said rocker axle in a plane perpendicular to the forward motion of said implement but said tool bars will not substantially rotate a horizontal plane relative to said frame.

9. An agriculture implement for light soil tillage immediately preceeding a trailing, agriculture earth working device, said implement comprising:
  (a) a frame shaped for connection to a forward side of the earth working device, and including mobile ground engaging support means for translating said implement over the ground;
  (b) a control arm having one end thereof pivotally connected with said frame;
  (c) a motor connected with and selectively rotating said control arm with respect to said frame;
  (d) a tool support carriage suspended from and operably connected with the other end of said control arm and adapted for mounting a plurality of earth working tools thereto;
  (e) a linkage arm having first and second ends thereof pivotally connected with said frame and said tool support carriage respectively; said linkage arm second end being spaced apart from said control arm other end to securely retain tool orientation when said implement is in a tilling position;
  (f) a longitudinally resilient member having first and second ends thereof respectively connected with said tool support carriage and said control arm other end, whereby rotation of said control arm in a normally downwardly direction resiliently urges said tools into the ground when said implement is in the tilling position;
  (g) stop means limiting maximum separation between said tool support carriage and said control arm, and positively interconnecting the same when said implement is in a transport position, whereby rotation of the control arm in a normally upwardly direction lifts said tools out of engagement with the ground for transport; and
  (h) a connector arm pivotally connecting said tool support carriage to said control arm, said connector arm having one end thereof pivotally connected to said control arm at a point spaced inwardly of said control arm other end, an opposite end thereof pivotally connected to said tool support carriage, whereby movement of said tool support carriage relative to said control arm in a horizontal direction is substantially limited, and said tool support carriage may be urged to move in a vertical direction relative to said control arm but is biased to a specific relative position therefrom by said resilient member.

10. An implement according to claim 9 wherein:

(a) said control arm, tool support, linkage arm, resilient member, and stop means form a mounting mechanism; and including:
(b) a plurality of said mounting mechanisms;
(c) a rocker shaft being connected with said frame for axial rotation thereabout and being fixedly perpendicular to each of said mounting mechanism control arms; and wherein
(d) said motor is connected with and rotates said rocker shaft, whereby all of said mounting mechanisms are operably rotated in unison.

* * * * *